United States Patent
Saur et al.

(10) Patent No.: US 9,097,331 B2
(45) Date of Patent: Aug. 4, 2015

(54) HAND-HELD POWER TOOL HAVING A PLANETARY GEARBOX

(75) Inventors: Dietmar Saur, Gomaringen (DE); Joerg Welke, Ettlingen-Schoellbronn (DE); Michael-Andreas Grunwald, Stuttgart-Rohr (DE)

(73) Assignee: ROBERT BOSCH GMBH, Stuttgart (DE)

( * ) Notice: Subject to any disclaimer, the term of this patent is extended or adjusted under 35 U.S.C. 154(b) by 200 days.

(21) Appl. No.: 13/520,313

(22) PCT Filed: Dec. 7, 2010

(86) PCT No.: PCT/EP2010/069033
§ 371 (c)(1),
(2), (4) Date: Nov. 28, 2012

(87) PCT Pub. No.: WO2011/085871
PCT Pub. Date: Jul. 21, 2011

(65) Prior Publication Data
US 2013/0065727 A1 Mar. 14, 2013

(30) Foreign Application Priority Data
Jan. 12, 2010 (DE) .......................... 10 2010 000 795

(51) Int. Cl.
F16H 3/22 (2006.01)
F16H 57/021 (2012.01)
B25F 5/00 (2006.01)
F16H 57/08 (2006.01)

(52) U.S. Cl.
CPC .............. *F16H 57/021* (2013.01); *B25F 5/001* (2013.01); *F16H 3/22* (2013.01); *F16H 57/08* (2013.01)

(58) Field of Classification Search
CPC ......... F16H 3/22; F16H 57/021; F16H 57/08; B25F 5/001

USPC ..................... 475/298, 299, 300; 173/47, 216
See application file for complete search history.

(56) References Cited

U.S. PATENT DOCUMENTS

| | | | | |
|---|---|---|---|---|
| 2,253,915 A * | 8/1941 | Racklyeft | ........................ | 38/59 |
| 5,098,355 A * | 3/1992 | Long | .............................. | 475/220 |
| 5,813,938 A * | 9/1998 | Forster | .......................... | 475/331 |
| 6,070,675 A | 6/2000 | Mayer et al. | | |
| 7,090,032 B2 * | 8/2006 | Wada et al. | .................... | 173/217 |
| 7,604,528 B2 * | 10/2009 | Lo et al. | ......................... | 451/354 |
| 8,066,611 B2 * | 11/2011 | Spielmann et al. | ............ | 475/299 |
| 2005/0215385 A1 | 9/2005 | Spielmann et al. | | |
| 2005/0252670 A1 * | 11/2005 | Prell et al. | ........................ | 173/39 |
| 2006/0048959 A1 * | 3/2006 | Sakai et al. | .................... | 173/216 |

(Continued)

FOREIGN PATENT DOCUMENTS

| | | |
|---|---|---|
| CN | 2441614 | 8/2001 |
| CN | 1419997 | 5/2003 |

(Continued)

OTHER PUBLICATIONS

International Search Report for PCT/EP2010/069033, dated Mar. 28, 2011.

*Primary Examiner* — Roger Pang
(74) *Attorney, Agent, or Firm* — Kenyon & Kenyon LLP

(57) ABSTRACT

In a hand-held power tool having a planetary gearbox which is situated in a housing interior formed by a gear housing, at least one cross pin is fastened in the housing interior for axial support of the planetary gearbox in the gear housing.

23 Claims, 5 Drawing Sheets

(56) References Cited

U.S. PATENT DOCUMENTS

| | | | |
|---|---|---|---|
| 2008/0032848 A1* | 2/2008 | Ho | 475/299 |
| 2009/0126958 A1* | 5/2009 | Trautner et al. | 173/48 |
| 2010/0273598 A1* | 10/2010 | Kusuda | 475/149 |
| 2011/0079408 A1* | 4/2011 | Grunwald et al. | 173/47 |
| 2013/0299206 A1* | 11/2013 | Hecht et al. | 173/104 |

FOREIGN PATENT DOCUMENTS

| | | |
|---|---|---|
| CN | 101082366 | 12/2007 |
| DE | 101 49 382 | 5/2003 |
| GB | 2 335 011 | 9/1999 |
| GB | 2382388 | 5/2003 |
| JP | 2005-254445 | 9/2005 |

* cited by examiner

HAND-HELD POWER TOOL HAVING A PLANETARY GEARBOX

BACKGROUND OF THE INVENTION

1. Field of the Invention

The present invention relates to a hand-held power tool having a planetary gearbox which is situated in the housing interior formed by a gear housing.

2. Description of the Related Art

Hand-held power tools of this type are known from the related art in which the gear housing of a corresponding planetary gearbox has a multi-part design, the individual housing parts being connected to one another by form-locked, force-fitted, or integral connections. For example, the housing parts are screwed, glued, welded to one another, and/or clamped in relation to one another using spring elements. In this way, the planetary gearbox is supported axially in the gear housing by an end cap which is fastened to the gear housing.

Moreover, the planetary gearbox of this type of power tools may be shiftable between two or more gears. Here, a shifting mechanism for shifting gears is provided using which an annulus gear, which is associated with the planetary gearbox and is situated in a central part of the housing, is, for example, displaceable between a first and a second operating position, the first operating position being associated with a first gear, and the second operating position being associated with a second gear of the planetary gearbox. The shifting mechanism includes a sliding element using which a pivoting or a sliding bracket is operatable, which is mounted on the outside of the central part of the housing and is connected to the annulus gear through recesses in the central part of the housing. When the sliding element is displaced, this bracket is moved from a first position, which is, for example, associated with the first gear, into a second position, which is, for example, associated with the second gear, and thus displaces the annulus gear from its first operating position into the second operating position.

The disadvantage of the related art is that the assembly of this type of power tools or planetary gearboxes is expensive and complex and the power tools have a relatively large tolerance chain due to the large number of components which are to be connected to one another.

BRIEF SUMMARY OF THE INVENTION

One object of the present invention is thus to provide a novel hand-held power tool having a reduced tolerance chain.

This object is achieved by a hand-held power tool having a planetary gearbox which is situated in the housing interior formed by a gear housing. To axially support the planetary gearbox in the gear housing, at least one cross pin is fastened in the housing interior.

Thus, the present invention allows a hand-held power tool to be provided which has a planetary gearbox and a simple and robust design.

The gear housing preferably has a housing wall at which at least two fastening elements for fastening the at least one cross pin are provided.

It is thus possible to achieve a safe and reliable fastening of the cross pin in the gear housing.

The at least one cross pin is preferably mounted in associated openings of the housing wall.

It is thus possible to achieve a stable and cost-effective mounting of the cross pin in the gear housing.

According to one specific embodiment, the planetary gearbox is shiftable at least between a first and a second gear. The planetary gearbox is associated with an operatable switching element for shifting gears which is mounted in the interior of the gear housing.

The present invention thus makes it possible to provide a simple and compact gear housing, in which the switching element is integrated into the housing, and thus an implementation of lateral recesses on the housing for switching activation may be dispensed with.

The switching element is preferably mounted on the at least one cross pin.

In this way, a centric mounting and a safe, direct force support of the switching element in the gear housing may be achieved, the axial support of the planetary gearbox and the mounting of the switching element in the gear housing being implemented using only one component.

According to one specific embodiment, the switching element has a spring element.

The present invention thus enables a cost-effective design of the switching element.

The spring element is elastically deformable in the axial direction of the gear housing preferably at least from a first to a second switching state. The first switching state is thus associated with the first gear, and the second switching state is associated with the second gear of the planetary gearbox.

It is thus possible to provide a simple and reliable switching element for shifting between the first and the second gears.

An operating element is preferably assigned to the spring element, the operating element being designed to allow for an elastic deformation of the spring element in the axial direction of the gear housing through a displacement in the axial direction of the gear housing.

Thus, a switching path, which is necessary for gear shifting, by a switching device provided with the switching element and the operating element is establishable in a simple manner to the axial direction of the gear housing, so that a solid deflection of forces occurring during a gear shift via the gear housing is made possible.

The planetary gearbox is preferably assigned a ratchet wheel which is displaceable in the axial direction of the gear housing at least from a first to a second operating position by operating the switching element. The first operating position is associated with the first gear, and the second operating position is associated with the second gear.

Thus, a switching device having a comparatively reduced tolerance chain may be provided.

The object stated at the outset is also achieved by a planetary gearbox which is situated in a housing interior formed by a gear housing. To axially support the planetary gearbox in the gear housing, at least one cross pin is fastened in the housing interior.

The object stated at the outset is also achieved by a hand-held power tool having a planetary gearbox which is situated in a housing interior formed by a gear housing and is shiftable at least between a first and a second gear. An operatable switching element for shifting gears is assigned to the planetary gearbox. The switching element is mounted in the interior of the gear housing.

DETAILED DESCRIPTION OF THE INVENTION

Figure 1:
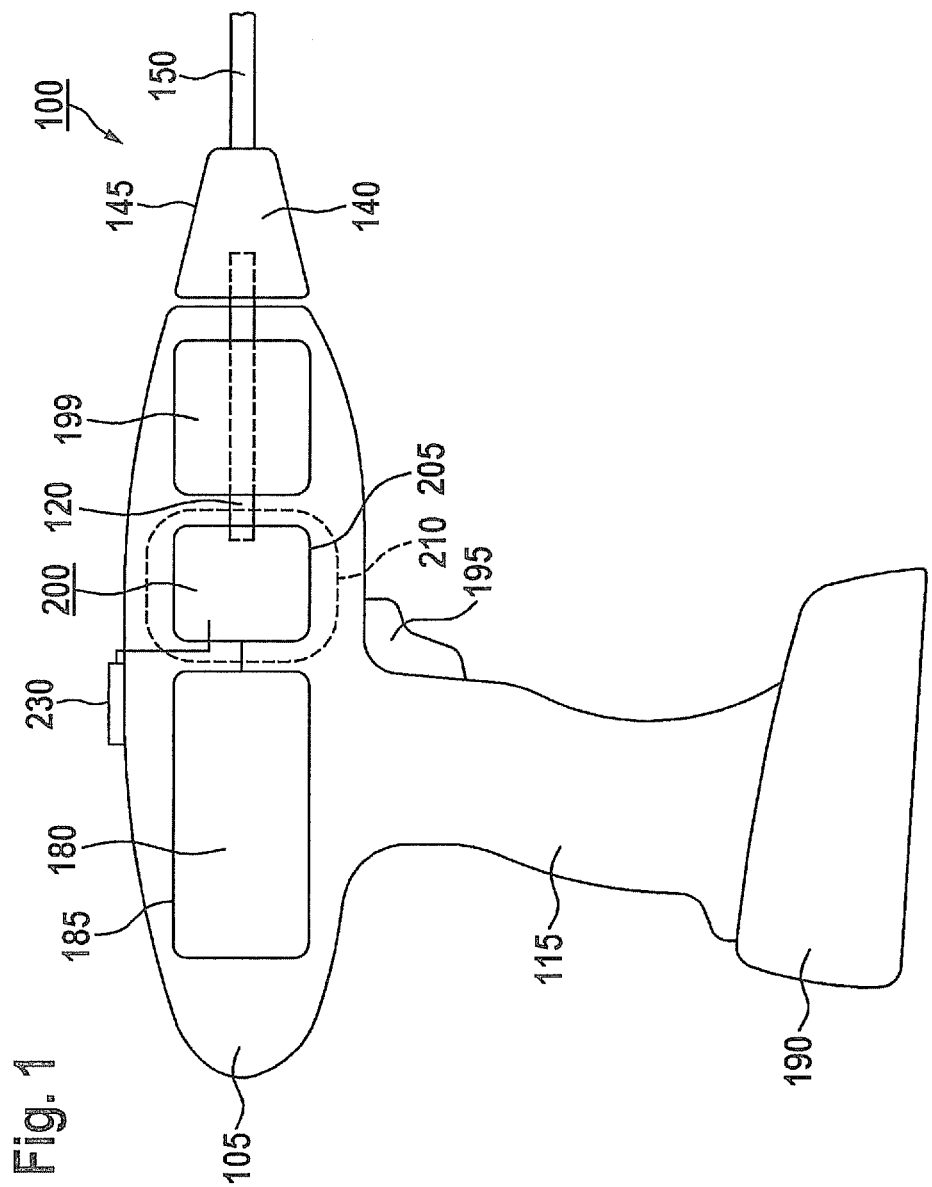
FIG. 1 shows a schematic view of a hand-held power tool according to one specific embodiment.

FIG. 1 shows a hand-held power tool 100 which has a housing 105 including a handle 115. According to one specific embodiment, power tool 100 is connectable mechanically and electrically to a battery pack 190 for a cordless power supply. In FIG. 1, power tool 100 is designed as a cordless combi drill as an example. It is, however, pointed out that the present invention is not limited to cordless combi drills, but may rather be used for various, in particular battery-operated, power tools, in which a tool is set into rotation, e.g., in a cordless screwdriver, a cordless percussion drill, etc.

An electric drive motor 180, which is supplied with current by battery pack 190, and a gear 200 are situated in housing 105. Drive motor 180 is connected to a drive shaft 120, e.g., a drive spindle, via gear 200. Drive motor 180 is illustratively situated in a motor housing 185, and gear 200 in a gear housing 205, gear housing 205 and motor housing 185 being situated in housing 105 as an example.

Drive motor 180 is, for example, operatable via a manual switch 195, i.e., may be switched on and off, and may be any type of motor, e.g., an electronically commuted motor or a DC motor. Preferably, drive motor 180 may be controlled or regulated electronically in such a way that a reverse operation and input with regard to a desired rotational speed are implementable. The mode of operation and the design of a suitable drive motor are sufficiently known from the related art so that a detailed description thereof is dispensed with for the sake of a concise description.

According to one specific embodiment, gear 200 is a planetary gearbox having different gear stages or planetary stages, a torque clutch 199 being optionally associated with it. Gear 200 is shiftable between a first and a second gear via an associated operating element 230. During operation of power tool 100, planetary gearbox 200 is rotatably driven by drive motor 180. Planetary gearbox 200 is described below in detail with reference to a sectional view (shown in enlarged representation in FIG. 2) of a section 210 of power tool 100.

A tool holder 140, which has a drill chuck 145 as an example, is associated with gear 200. This tool holder 140 is used to hold a tool 150 and may be integrally connected to drive shaft 120 drivable by drive motor 180 via gear 200, or may be connected to it in the form of an attachment.

Figure 2:
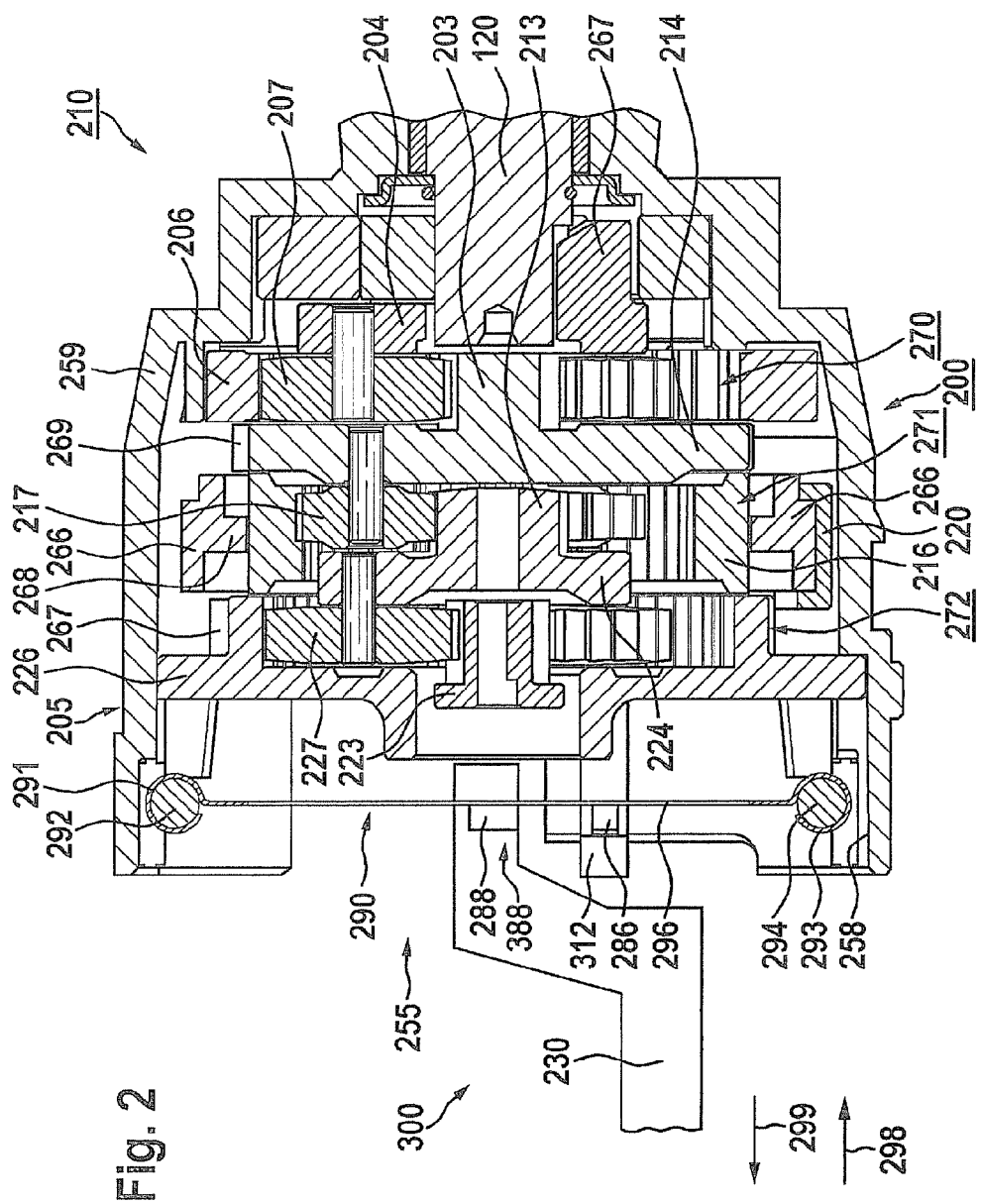
FIG. 2 shows an enlarged sectional view of a section of the power tool of FIG. 1.

FIG. 2 shows section 210 of hand-held power tool 100 of FIG. 1. This demonstrates an exemplary embodiment of planetary gearbox 200.

Planetary gearbox 200 illustratively has three gear stages or planetary stages situated in a housing interior 255 formed by gear housing 205: a front stage 270, a central stage 271, and a rear stage 272. Front planetary stage 270, for example, has a sunwheel 203, at least one planetary wheel 207, a planet carrier or entrainer 204 having a rotary entraining contour 267, as well as an annulus gear 206 which is situated axially and radially fixed in housing interior 255. Central planetary stage 271, for example, has a sunwheel 213, at least one planetary wheel 217, a planet carrier 214, as well as an annulus gear 216 which is situated axially fixed, but radially movable in housing interior 255. Planet carrier 214 forms sunwheel 203 of front planetary stage 270; sunwheel 203 may be fastened appropriately to planet carrier 214 or may be integrally connected to it or may be designed in one piece with it. An entraining element 269 is illustratively implemented at the outer periphery of planet carrier 214. Rear planetary stage 272, for example, has a sunwheel 223, at least one planetary wheel 227, a planet carrier 224, as well as an annulus gear 226 which is situated axially and radially fixed in housing interior 255. Planet carrier 224 forms sunwheel 213 of central planetary stage 271; sunwheel 213 may be fastened appropriately to planet carrier 224 or may be integrally connected to it or may be designed in one piece with it. A blocking element 267 is illustratively implemented at the outer periphery of annulus gear 226.

According to one specific embodiment, planetary gearbox 200 is designed as a reduction gear unit which is shiftable between a first and a second gear, for example. For this purpose, a ratchet wheel 266, which is axially displaceable and radially movable and which is radially fixedly or rotatably fixedly connected to annulus gear 216 of central planetary stage 271, is provided in housing interior 255. Ratchet wheel 266 is displaceable in the axial direction of gear housing 205 from a first into a second operating position, as described below for FIG. 5. The first operating position is associated with the first gear, for example, and the second operating position is associated with the second gear of planetary gearbox 200, for example. A holding element 268 is illustratively implemented at the inner periphery of ratchet wheel 266.

Figure 3:
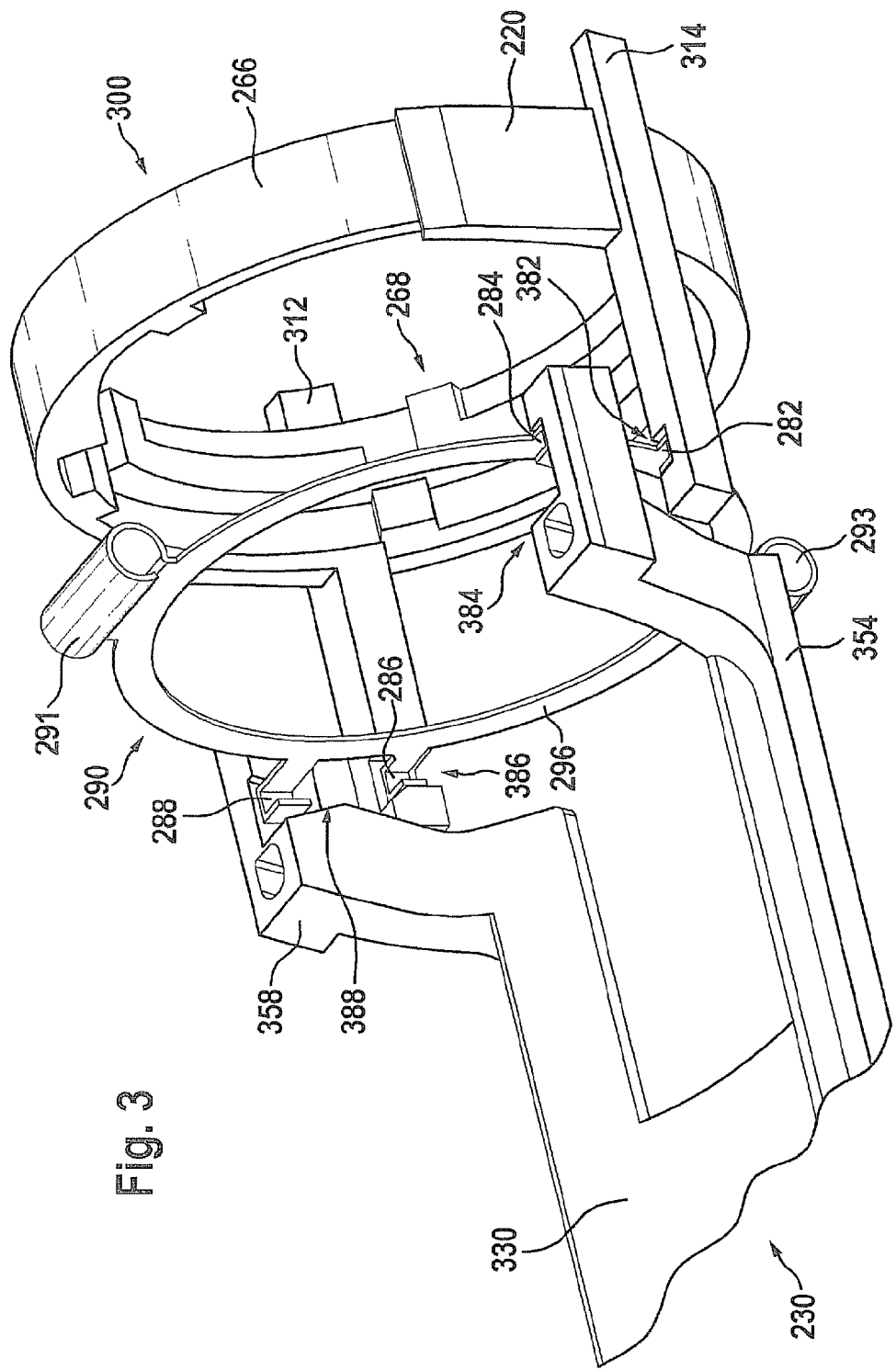
FIG. 3 shows an enlarged perspective view of the switching device of FIG. 2

Ratchet wheel 266 is situated at least sectionally in a sliding element 220. The latter has, for example, a semi-annular shape having a U profile directed radially inward, in which ratchet wheel 266 is rotatably mounted, as shown in FIG. 3. Sliding element 220 and, together with it, ratchet wheel 266 are axially displaceable between the first and the second operating positions via an operatable switching element 290.

Figure 4:
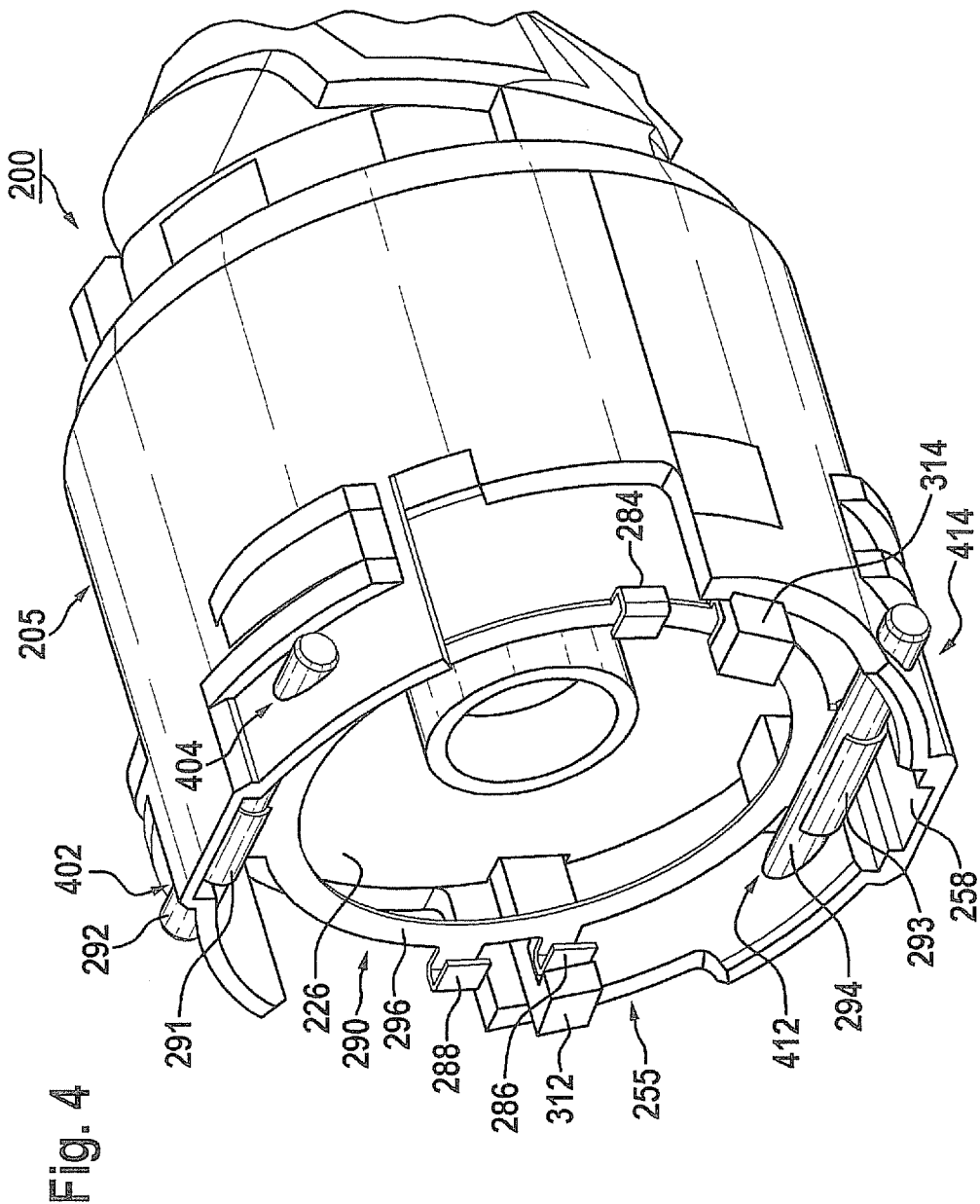
FIG. 4 shows a perspective view of the gear housing of FIG. 2 having the switching device of FIG. 2 provided on it, without the operating element of FIG. 2.

Switching element 290 has, for example, a spring element 296 situated in housing interior 255, which has two illustratively arc-shaped holding elements 291, 292 which are mounted on a first or a second cross pin 292 or 294. Cross pins 292, 294 are fastened for axial support of planetary gearbox 200 in housing interior 255 of gear housing 205, as shown in FIG. 4, to block a displacement of planetary gearbox 200 in gear housing 205 in the direction of arrow 299. According to one specific embodiment, cross pins 292, 294 are situated in the direction of arrow 299 behind annulus gear 226 of rear planetary stage 272. Illustratively, cross pins 292, 294 are situated in the area of an inside 258 of a housing wall 259 of gear housing 205.

Figure 5:
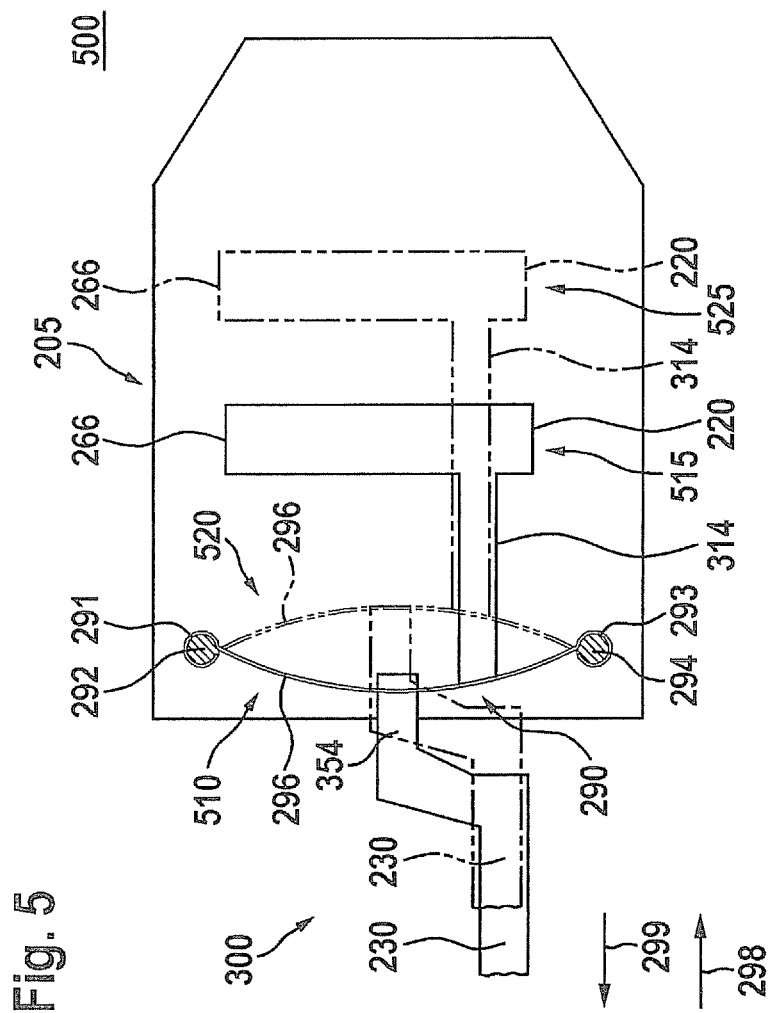
FIG. 5 shows a schematic representation of a switching operation in the gear housing of FIG. 2, using the switching device of FIG. 2.

Spring element 296 is elastically deformable in the axial direction of gear housing 205 from a first into a second switching state, as shown in FIG. 5. The first switching state here corresponds to the first gear, for example, and the second switching state corresponds to the second gear of planetary gearbox 200. At least one first, for example U-shaped, fastening element 286 is provided on spring element 296, for example, integrally connected to it or designed in one piece with it, to which a first, for example rod-shaped, connecting element 312 is fastened which is also connected or fastened to sliding element 220. Moreover, at least one second, for example U-shaped, fastening element 288 is provided on spring element 296, for example, integrally connected to it or designed in one piece with it, to which operating element 230 is fastened, for example via a fastening element 388. This operating element 230 is designed to allow for an elastic deformation of spring element 296 in the axial direction of gear housing 205 by a displacement in the axial direction of gear housing 205 in the direction of arrow 299 or an arrow 298. According to one specific embodiment, operating element 230, switching element 290, sliding element 220, annulus gear 266, and connecting element 312 form a switching device 300, which is illustrated in FIG. 3.

During operation of power tool 100 of FIG. 1, the torque of drive motor 180 of FIG. 1 is transmitted to drive shaft 120 via planetary stages 272, 271, 270 of planetary gearbox 200 with the aid of rotary entraining contour 267 of entrainer 204. Here, planetary gearbox 200 functions according to one specific embodiment in the manner of a reduction gear unit in which a great torque and a small rotational speed are transmitted to drive shaft 120 in the first gear, for example, while, in comparison, a reduced torque and an increased rotational speed are transmitted in the second gear.

By displacing operating element 230 in the direction of arrow 299, sliding element 220 and thus ratchet wheel 266 are displaced from the center position shown in FIG. 2 into its first operating position which is associated with the first gear. In this first operating position, holding element 268 of ratchet wheel 266 meshes with blocking element 267 of annulus gear 226 of rear planetary stage 272. Ratchet wheel 266 is thus radially fixedly or rotatably fixedly connected to annulus gear 226 so that a great torque and a small rotational speed are transmitted to drive shaft 120. By displacing operating element 230 in the direction of arrow 298, sliding element 220 and thus ratchet wheel 266 are displaced from the center position shown in FIG. 2 into its second operating position which is associated with the second gear. In this way, holding element 268 of ratchet wheel 266 meshes with entraining element 269 of planet carrier 214 of central planetary stage 271, so that ratchet wheel 266 is radially movably connected to planet carrier 214. Thus, a reduced torque and an increased rotational speed may be transmitted as compared to the operation in the first gear.

Since the design and the mode of operation of a planetary gearbox having a gear shift are sufficiently known to those skilled in the art, a detailed description thereof is dispensed with for the sake of a concise description. It is, however, pointed out that the center position of spring element 296 shown in FIG. 2 is only used to simplify the drawing and to illustrate holding element 268, blocking element 267, and entraining element 269. However, spring element 296 is designed according to one specific embodiment in such a way that after an installation of planetary gearbox 200 in gear housing 205 it automatically elastically springs into its first or second operating position every time operating element 230 is operated and remains there self-holding until a next operation of operating element 230. Therefore, spring element 296 may also be referred to as a bistable spring element.

FIG. 3 shows switching device 300 of FIG. 2 having operating element 230, switching element 290, sliding element 220, annulus gear 266, and connecting element 312. Moreover, switching device 300 illustratively has another, for example rod-shaped, connecting element 314, which connects switching element 290 to sliding element 220.

According to one specific embodiment, connecting elements 312, 314, are integrally connected to sliding element 220 or designed in one piece with it. Alternatively, connecting elements 312, 314 may, however, be connected to sliding element 220 in another suitable manner, e.g., glued or welded. Moreover, connecting elements 312, 314 may be latched to sliding element 220, or sliding element 220 may be pressed into corresponding groove-shaped recesses which are provided at connecting elements 312, 314.

FIG. 3 illustrates an exemplary embodiment of holding element 268 of ratchet wheel 266. The holding element is, as described above, designed to mesh with blocking element 267 of annulus gear 226 of rear planetary stage 272 of FIG. 2 in the first operating position of ratchet wheel 266, and with entraining element 269 of planet carrier 214 of central planetary stage 271 in the second operating position of ratchet wheel 266. Here, holding element 268 may have any configuration which enables this functionality.

Switching element 290 illustratively has annular spring element 296 which has arc-shaped holding elements 291, 293, first fastening element 288, second fastening element 286, as well as a third fastening element 284 and a fourth fastening element 282. First fastening element 288 is, as described for FIG. 2, fastened to, e.g., latched to or pressed into, fastening element 388. Fastening element 388 is formed on a first lateral arm 358 of operating element 230. Third fastening element 284 is fastened to, e.g., latched to or pressed into, a fastening element 384. Fastening element 384 is formed on a second lateral arm 354 of operating element 230. Lateral arms 354, 358 are shown approximately in a reverse Z shape in FIG. 3 as an example and are connected to one another via a connecting part 330.

Second fastening element 286 is fastened to, e.g., latched to or pressed into, fastening element 386 of connecting element 312. Fourth fastening element 282 is fastened to, e.g., latched to or pressed into, a fastening element 382 provided on connecting element 314.

FIG. 4 shows gear housing 205 of FIG. 2 in which planetary gearbox 200 of FIG. 2 is situated and axially supported via cross pins 292, 294. For this purpose, fastening elements 402, 404, 412, 414 are provided on housing wall 259 of gear housing 205 for fastening cross pins 292 and 294. They are designed as openings in housing wall 259 as an example in which cross pins 292 and 294 are mounted. Here, cross pins 292, 294 may be fastened, e.g., pressed into, glued, or welded, in openings 402, 404 or 412, 414.

At cross pins 292, 294, elastic switching element 290, which is situated completely in housing interior 255, is mounted via arc-shaped holding elements 291 and 293. Switching element 290 is connected to sliding element 220, in which ratchet wheel 266 is rotatably mounted, via connecting webs 312, 314, as described in FIGS. 2 and 3.

FIG. 5 shows a highly simplified representation 500 including switching device 300 and gear housing 205 of FIG. 2 for purposes of illustrating the mode of operation. Operating element 230, spring element 296, connecting rod 314, sliding element 220, and ratchet wheel 266 are shown as solid lines in gear housing 205 in a rear position, which corresponds to a first switching state 510 of spring element 296 or a first operating position 515 of switching element 220, which are associated with the first gear of planetary gearbox 200 of FIG. 2.

By axially displacing operating element 230 in the direction of arrow 299, spring element 296 is elastically deformed into a second switching state 520, sliding element 220 and ratchet wheel 266 being axially displaced in the direction of arrow 299 in a second operating position 525, which is associated with the second gear of planetary gearbox 200 of FIG. 2. This front position of switching device 300 is shown as dashed lines for illustration purposes. Moreover, the solid and the dashed lines are illustrated slightly offset to one another to facilitate their differentiation.

Due to the axial displacement of operating element 230 in the direction of arrow 298, switching device 300 may be displaced back into the rear position. Thus, a gear shift from the first to the second gear or vice versa of planetary gearbox 200 of FIG. 2 may take place due to the axial displacement of operating element 230 in the direction of arrows 299 or 298.

What is claimed is:

1. A hand-held power tool, comprising:
   a housing including a handle;
   a gear housing situated in the housing;
   a planetary gearbox situated in a housing interior formed by the gear housing, wherein the planetary gearbox comprises at least one gearbox component that is situated non-rotatably fixed in the housing interior;
   a tool holder which is driven by a drive motor via the planetary gearbox; and
   at least one cross pin fixedly connected to the gear housing and in contact with the at least one gearbox component of the planetary gearbox, wherein the at least one cross pin provides axial support and prevents axial displacement of the planetary gearbox in the gear housing.

2. The power tool as recited in claim 1, wherein the gear housing has a housing wall at which at least two fastening elements for fastening the at least one cross pin are provided.

3. The power tool as recited in claim 1, wherein the at least one cross pin is mounted in associated openings of the housing wall.

4. The power tool as recited in claim 3, wherein:
   the planetary gearbox is shiftable at least between a first and a second gear; and
   a switching element for shifting gears is associated with the planetary gearbox, the switching element being mounted in the housing interior of the gear housing.

5. The power tool as recited in claim 4, wherein the switching element is mounted on the at least one cross pin.

6. The power tool as recited in claim 4, wherein the switching element is embodied as a spring element.

7. The power tool as recited in claim 6, wherein the spring element is elastically deformable in the axial direction of the gear housing at least from a first to a second switching state, the first switching state being associated with the first gear and the second switching state being associated with the second gear of the planetary gearbox.

8. The power tool as recited in claim 6, wherein an operating element is associated with the spring element, the operating element being configured to enable an elastic deformation of the spring element in the axial direction of the gear housing by a displacement in the axial direction of the gear housing.

9. The power tool as recited in claim 4, wherein a switch wheel is associated with the planetary gearbox, the switch wheel being displaceable in the axial direction of the gear housing at least from a first into a second operating position by operating the switching element, the first operating position being associated with the first gear and the second operating position being associated with the second gear.

10. A hand-held power tool, comprising:
    a housing including a handle;
    a gear housing situated in the housing;
    a planetary gearbox situated in a housing interior formed by the gear housing, wherein the planetary gearbox is shiftable at least between a first and a second gear, wherein the planetary gearbox includes an axially shiftable gearbox component that is axially shiftable at least between a first position associated with the first gear and a second position associated with the second gear;
    a tool holder which is driven by a drive motor via the planetary gearbox; and
    a switching element for shifting gears, wherein the switching element is associated with the planetary gearbox, the switching element being mounted to the gear housing in the housing interior of the gear housing,
    wherein the switching element is embodied as an annular spring element which is configured to axially shift the axially shiftable gearbox component between the first position and the second position.

11. The hand-held power tool as recited in claim 10, wherein the shiftable gearbox component is embodied as a switch wheel.

12. The hand-held power tool as recited in claim 11, wherein the switch wheel is connected to an annulus gear of the planetary gearbox in a rotatably fixed manner.

13. The hand-held power tool as recited in claim 10, wherein the spring element is embodied as a bistable spring element.

14. The hand-held power tool as recited in claim 10, wherein the spring element is elastically deformable in the axial direction of the gear housing at least from a first to a second switching state, the first switching state being associated with the first gear and the second switching state being associated with the second gear of the planetary gearbox.

15. The hand-held power tool as recited in claim 10, wherein an operating element is associated with the spring element, the operating element being configured to enable an elastic deformation of the spring element in the axial direction of the gear housing by a displacement in the axial direction of the gear housing.

16. The hand-held power tool as recited in claim 10, wherein the switching element is mounted to the gear housing in the housing interior on at least one cross pin, wherein the at least one cross pin is fixedly connected to the gear housing.

17. The hand-held power tool as recited in claim 16, wherein the planetary gearbox comprises at least one gearbox component that is situated non-rotatably fixed in the housing interior, and the at least one gearbox component is in contact with the at least one cross pin, wherein the at least one cross pin provides axial support and prevents axial displacement of the planetary gearbox in the gear housing.

18. The hand-held power tool as recited in claim 17, wherein the at least one gearbox component is embodied as an annulus gear which is situated axially and radially fixed in the housing interior.

19. The hand-held power tool as recited in claim 1, wherein the at least one gearbox component is embodied as an annulus gear which is situated axially and radially fixed in the housing interior.

20. The hand-held power tool as recited in claim 1, wherein at least two cross pins are provided, wherein the at least two cross pins are arranged diametrically opposed relative to a spindle of the hand-held power tool.

21. The hand-held power tool as recited in claim 9, wherein the switch wheel is connected to an annulus gear of the planetary gearbox in a rotatably fixed manner.

22. The hand-held power tool as recited in claim 6, wherein the spring element is embodied as an annular spring element.

23. The hand-held power tool as recited in claim 6, wherein the spring element is embodied as a bistable spring element.

* * * * *